(12) United States Patent
Enlow et al.

(10) Patent No.: US 6,919,389 B2
(45) Date of Patent: Jul. 19, 2005

(54) POLYMER COMPOSITIONS CONTAINING BENZIMIDAZOLE BASED STABILIZER COMPOUNDS

(75) Inventors: William Palmer Enlow, Belpre, OH (US); Marshall D. Moore, Morgantown, WV (US); Vaikunth Sitaram Prabhu, Morgantown, WV (US); Tilak T. Raj, Bangalore (IN); Arakali Srinivasarao Radhakrishna, Bangalore (IN); Raju Kharatkar, Bangalore (IN)

(73) Assignee: Crompton Corporation, Middlebury, CT (US)

( * ) Notice: Subject to any disclaimer, the term of this patent is extended or adjusted under 35 U.S.C. 154(b) by 188 days.

(21) Appl. No.: 10/387,998

(22) Filed: Mar. 13, 2003

(65) Prior Publication Data

US 2004/0180995 A1 Sep. 16, 2004

(51) Int. Cl.$^7$ .............................. C08K 5/34; C08K 5/04; C08K 5/09; C08K 3/18; C08K 3/22
(52) U.S. Cl. .............................. 524/89; 524/90; 524/93; 524/400; 524/432; 524/433
(58) Field of Search .............................. 524/89, 90, 93, 524/400, 432, 433

(56) References Cited

U.S. PATENT DOCUMENTS

| | | | |
|---|---|---|---|
| 4,256,819 A | * 3/1981 | Webster et al. | ............... 430/41 |
| 4,305,866 A | 12/1981 | York et al. | |
| 4,403,053 A | 9/1983 | Lewis | |
| 4,443,572 A | 4/1984 | Burns | |
| 5,459,222 A | 10/1995 | Rodgers et al. | |
| 6,562,832 B1 | * 5/2003 | Adams et al. | ............... 514/274 |

OTHER PUBLICATIONS

P. Madsen, L.B. Knudsen, F.C. Wiberg and R.D. Carr, Journal Med. Chem. 1988, vol. 41, 5150–5157.
B.R. Sharma and H.K. Puri, Indian Journal of Chem., Dec., 1985, vol. 24B, 1224–1226.
V. Bindal, K. Jain, R.N. Handa, and H.K. Puri, Indian Journal of Chem., 1986, vol. 25B, 807–811.

* cited by examiner

*Primary Examiner*—Kriellion A. Sanders
(74) *Attorney, Agent, or Firm*—Michael P. Dilworth

(57) ABSTRACT

The invention discloses a stabilized resin composition comprising a thermoplastic resin and a stabilizing benzimidazole based additive compound. In a second embodiment, the invention discloses a method to make a stabilized composition comprising a benzimidazole based stabilizing compound and a resin, said method comprising mixing said benzimidazole based stabilizing compound with said resin.

21 Claims, No Drawings

POLYMER COMPOSITIONS CONTAINING BENZIMIDAZOLE BASED STABILIZER COMPOUNDS

BACKGROUND OF THE INVENTION

The present invention relates to compositions and stabilizers for polymeric resin compositions, and more particularly relates to stabilized resin compositions and stabilizer concentrates for resin compositions. The need for stabilization of polymeric compositions is known, and the use of compounds such as hydroxyl amines, amine oxides, lactones, hindered phenolics, and phosphites is also generally known. For example, U.S. Pat. No. 4,403,053 discloses stabilization of polyolefins with a benzotriazole and a phosphite, and U.S. Pat. No. 4,305,866, discloses stabilization of polyolefin with the phosphite. As a further example, U.S. Pat. No. 4,443,572 discloses stabilization of polyolefins with a phosphites, hindered phenols and thioesters. Benzimidazole based compounds have been synthesised and are known for their anthelmentic activity. The process for making Thiazolebenzimidazole compounds are described for example in B. R. Sharma and H. K. Puri, Indian. J. Chem., 1985, 24B, 1224–1226 and V. Bindal, K. Jain, R. N. Handa, and H. K. Puri, Indian J. Chem., 1986, 25B, 807–811.

The present invention is concerned with the stabilization effect of benzimidazole based compounds with enhanced stabilizing brought about by the use of benzimidazole based compounds synergistically with other stabilizers such as hindered phenols, hindered amines and mixtures thereof.

SUMMARY OF THE INVENTION

The invention discloses a stabilised polymeric resin composition comprising a resin, and a benzimidazole based stabilizing additive compound. In a second embodiment, the invention discloses a method to make a stabilized resin composition said method comprising mixing said benzimidazole based stabilizing compound with said resin.

DETAILED DESCRIPTION OF THE INVENTION

The present invention relates to thermoplastic compositions, and stabilizers for thermoplastic compositions, and more particularly relates to stabilized thermoplastic compositions. A new class of stabilizing additives comprising substituted benzimidazoles is described which may be the resin stabilizer and may work synergistically with other stabilizers such as primary and phenolic antioxidants, 3-arylbenzofuranones, hindered amine stabilizers, ultraviolet light absorbers, phosphites, phosphonites, alkaline metal salts of fatty acids, metal oxides, hydrotalcites, epoxydized soybean oils, hydroxylamines, tertiary amine oxides, and/or thiosynergists.

Benzimidazole based compounds are known for their anthelmentic activity. Heterocyclic conjugated molecules with benzimidazole substituents have been used for photosensitive electrophoretic migration imaging (U.S. Pat. No. 4,256,819). Such molecules exhibit absorptions between about 400 and 750 nanometers. In one embodiment photosensitive may mean a conjugated molecule while in another embodiment photosensitive may mean a colored compound. The present inventors have discovered that benzimidazole based compounds may be used as stabilizers for resins in view of their radical scavenging ability which occurs due to the acidic hydrogen present in these compounds. Stabilizing may mean prevention of polymeric degradation during extrusion or any polymer processing. Further, stabilisition may include the stability of the polymer against change in molecular weight or melt flow index and even the yellowness index of the polymer during extrusion or any polymer processing operations. In another embodiment of the invention, stabilization may mean stabilization against degradation upon exposure to heating. In one embodiment, the resin may be present in a range between about 50 and about 99.99 percent by weight based on the total weight of the composition. In a second embodiment of the present invention, the resin may be present in a range between about about 80 and about 99.9 percent by weight based on the total weight of the composition. In a third embodiment, the resin may be present in a range between about 95 and about 99 percent by weight based on the total weight of the composition. In one embodiment of the present invention the benzimidazole based stabilizer may be present in a range between about 0.0001 and about 5 percent by weight based on the total weight of the composition. In a second embodiment the stabilizer may be present in a range between about 0.0005 and about 1 percent by weight based on the total weight of the composition. In a third embodiment the stabilizer may be present in a range between about 0.005 and about 0.1 percent by weight based on the total weight of the composition. In some embodiments the polymeric compositions may further contain a neutralizer, for example, a metal salt of a fatty acid such as calcium stearate, in a range between about 100 parts per million and about 3000 parts per million based on the total weight of the polymeric resin. The resin composition may further contain other stabilizers or may be free from them.

Benzimidazolone based stabilizer compositions may be in the form of stabilizer blends containing respective amounts of the benzimidazole based compound and a second stabilizer. In some embodiments the second stabilizer may be selected from the group consisting of phosphites, hindered phenols, hindered amines, and mixtures thereof. In one embodiment the benzimidazole based stabiliser and the second stabilizer may be present in respective weight ratios in a range between about 1:99 and about 99:1. In a second embodiment the benzimidazole based stabiliser compound and the second stabilizer may be present in respective weight ratios in a range between about 5:95 and about 95:5. In a third embodiment the benzimidazole based stabiliser compound and the second stabilizer may be present in weight ratios in a range between about 25:75 and about 75:25 on a respective weight ratio basis. In one embodiment, the stabilizer composition may contain a benzimidazole based stabilizer compound in a range between about 1 and about 99 percent by weight based on the total weight of the stabilizer composition, in a second embodiment in a range between about 5 and about 95 percent by weight based on the total weight of the composition and in a third embodiment in a range between about 25 and about 75 percent by weight based on the total weight of the composition. In one embodiment, the second stabilizer is present in a range between about 1 and about 99 percent by weight based on the total weight of the stabilizer composition, in a second embodiment in a range between about 5 and about 95 percent by weight based on the total weight of the stabilizer composition and in a third embodiment in a range between about 25 and about 75 percent by weight based on the total weight of the stabilizer composition.

The process for making Thiazolebenzimidazole compounds of structure (I) and the derivatives are described in B. R. Sharma and H. K Puri, Indian. J. Chem., 1985, 24B, 1224–1226; and V. Bindal, K. Jain, R. N. Handa, and H. K. Puri, Indian J. Chem., 1986, 25B, 807–811. In the present invention, 2-Mercaptobenzimidazole was condensed with chloroacetic acid to obtain respective benzimidazolethiolacetic acid followed by subsequent cyclization to obtain thiazolo[3,2-a]benzimidazol-3-one compounds. Processes for making benzimidazol-thioacetophenone compounds of structure (II) and it's derivatives are given in Madsen, Peter; Knudsen, Lotte B; Wiberg, Finn C. and Carr Richard D.; J. Med. Chem., (1998) 41(26), 5150–5157. In one embodiment, 2-Mercaptobenzimidazole can be condensed with phenacyl bromides and followed by N-acylation giving the respective benzimidazole-thioacetophenones.

The resin, also referred to as a polymeric resin, may be any thermoplastic known in the art, such as polyolefin homopolymers and copolymers, polyesters, polyurethanes, polyalkylene terephthalates, polysulfones, polyimides, polyphenylene ethers, styrenic polymers and copolymers, polycarbonates, acrylic polymers, polyamides, polyacetals and halide containing polymers. Mixtures of different polymers, such as polyphenylene ether/styrenic resin blends, polyvinyl chloride/ABS or other impact modified polymers, such as methacrylonitrile and alpha-methylstyrene containing ABS, and polyester/ABS or polycarbonate/ABS and polyester plus some other impact modifier may also be used. Such polymers are available commercially or may be made by means well known in the art. However, the benzimidazole additive compounds and stabilizer compositions of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

Polymers may also include styrenic polymers, such as polystyrene, poly-(p-methylstyrene), poly-(.alpha.-methylstyrene), copolymers of styrene or .alpha.-methylstyrene with dienes or acrylic derivatives, such as, for example, styrene/butadiene, styrene/acrylonitrile, styrene/alkyl methacrylate, styrene/maleic anhydride, styrene/maleimide, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene. Styrenic polymers may additionally or alternatively include graft copolymers of styrene or .alpha.-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene-propylene-diene terpolymers, styrene and acrylonitrile on polyacrylates or polymethacrylates, styrene and acrylonitrile on acrylate/butadiene copolymers, as well as mixtures thereof with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/-butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homo- and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4dimethylol-cyclohexane terephthalate, poly-2(2,2,4(4-hydroxyphenyl)-propane) terephthalate and polyhydroxybenzoates as well as block copolyetheresters derived from polyethers having hydroxyl end groups.

Polyamides and copolyamides which are derived from bisamines and dicarboxylic acids and/or from aminocarboxylic acids or the corresponding lactams, such as polyamide 4,polyamide 6,polyamide 6/6, 6/10, 6/9, 6/12 and 4/6, polyamide 11, polyamide 12, aromatic polyamides obtained by condensation of m-xylene bisamine and adipic acid; polyamides prepared from hexamethylene bisamine and isophthalic or/and terephthalic acid and optionally an elastomer as modifier, for example poly-2,4,4 trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Polyolefin, polyalkylene terephthalate, polyphenylene ether and styrenic resins, and mixtures thereof are more preferred, with polyethylene, polypropylene, polyethylene terephthalate, polyphenylene ether homopolymers and copolymers, polystyrene, high impact polystyrene, polycarbonates and ABS-type graft copolymers and mixtures thereof being particularly preferred.

The present compositions may optionally contain a stabilizer or mixture of stabilizers selected from the group consisting of the phenolic antioxidants, hindered amine stabilizers, the ultraviolet light absorbers, phosphites, phosphonites, alkaline metal salts of fatty acids, the hydrotalcites, metal oxides, epoxydized soybean oils, the hydroxylamines, the tertiary amine oxides, thermal reaction products of tertiary amine oxides, and the thiosynergists. By stabilizing amount is meant an amount effective to afford stabilization against, for example, molecular weight degradation, color degradation or molecular weight degradation and color degradation from melt processing, from weathering, and/or from long term field exposure to heat, light, and/or the elements.

The resulting stabilized polymeric resin compositions optionally also contain various conventional additives, such as the following:

Antioxidants: Antioxidants may comprise 1 Alkylated mono-phenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4isobutylphenol, 2,6-dicyclopentyl-4-methylphenol, 2-(.alpha.-methylcyclohexyl)-4,6 dimethylphenol, 2,6-di-octadecyl-4-methylphenol, 2,4,6,-tricyclohexyphenol, 2,6-di-tert-butyl-4-methoxymethylphenol. Alkylated hydroquinones, for example, 2,6di-tert-butyl-4-methoxyphenol, 2,5-di-tert-butylhydroquinone, 2,5-di-tert-amyl-hydroquinone, 2,6 diphenyl-4-octadecyloxyphenol, may also be used as antioxidants.

Antioxidants used may also comprise hydroxylated thiodiphenyl ethers, for example, 2,2'-thio-bis-(6-tert-butyl-4-methylphenol), 2,2'-thio-bis-(4-octylphenol), 4,4'thio-bis-(6-tertbutyl-3-methylphenol), 4,4'-thio-bis-(6-tert-butyl-2-methylphenol).

Alkylidene-bisphenols may be used as antioxidants as for example, 2,2'-methylene-bis-(6-tert-butyl-4-methylphenol), 2,2'-methylene-bis-(6-tert-butyl-4-ethylphenol), 2,2'-methylene-bis-(4-methyl-6-(.alpha.-methylcyclohexyl) phenol), 2,2'-methylene-bis-(4-methyl-6-cyclohexylphenol), 2,2'-methylene-bis-(6-nonyl-4-methylphenol), 2,2'-methylene-bis-(6-nonyl-4methylphenol), 2,2'-methylene-bis-(6-(.alpha.-methylbenzyl)-4-nonylphenol), 2,2'-methylene-bis-(6-(.alpha.,.alpha.-dimethylbenzyl)-4-nonyl-phenol). 2,2'-methylene-bis-(4,6-di-tert-butylphenol), 2,2'-ethylidene-bis-(6-tert-butyl-4-isobutylphenol), 4,4'methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane 2,6-di-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tert-butyl-4-hydroxy2-methylphenyl)-3-dodecyl-mercaptobutane, ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene, di-(2-(3'-tert-butyl-2'hydroxy-5'methylbenzyl)-6-tert-butyl-4-methylphenyl) terephthalate, and other phenolics such as monoacrylate esters of bisphenols such as ethylidiene bis-2,4-di-t-butylphenol monoacrylate ester and esters of 3-5 di butyl hydroxyphenyl propionic acid. The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl4-hydroxybenzylphosphonate, 1,3,5-tris(3,5-di-tert-butyl4-hydroxybenzyl)-isocyanurate, thiodiethylene bis(3,5-di-tert-butyl4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hyroxyhydrocinnamate), 1-(3,5-di-tert-butyl4-hydroxyanilino)-3,5-di(octylthio)-s-triazine, N,N'-hexamethylene-bis(3,5-di-tert-butyl4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl4-hydroxybenzylmercaptoacetate, bis(3,5-di-tert-butyl4-hydroxyhydrocinnamoyl)hydrazide, and N,N'-bis-[2-(3,5-di-tert-butyl-4-hydroxyhydrocinnamoyloxy)ethyl]-oxamide.

Other antioxidants that may be used include Benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4-hydroxybenzyl-mercaptoacetate, bis-(4-tert-butyl-3hydroxy-2,6-dimethylbenzyl)dithiol-terephthalate. 1,3,5-tris-(3,5-di-tert-butyl-4,10 hydroxybenzyl)isocyanurate. 1,3, 5-tris-(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5- di-tertbutyl-4-hydroxybenzylphosphonate, 1,3,5-tris-(3,5-dicyclohexyl-4-hydroxybenzyl)isocyanurate.

Acylaminophenols may be used as antioxidants, for example, 4-hydroxy-lauric acid anilide, 4-hydroxy-stearic acid anilide, 2,4-bis-octylmercapto-6-(3,5-tert-butyl-4-hydroxyanilino)-s-triazine, octyl-N-(3,5-di-tert-butyl-4-hydroxyphenyl)-carbamate.

Esters of beta-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thidiethyleneglycol, dihydroxyethyl oxalic acid diamide may be used as antioxidants.

Antioxidants may also comprise amides of beta-(3,5-di-tert-butyl-4hydroxyphenol)-propionic acid for example, N,N'-di-(3,5-di-tert-butyl-4-hydroxyphenylpropionyl)-hexamethylendiamine, N,N'-di-(3,5-di-tert-butyl-4-hydroxyphenylpropionyl)trimethylenediamine, N,N'-di(3,5-di-tert-butyl-4-hydroxyphenylpropionyl)-hydrazine.

UV absorbers and light stabilizers may comprise 2-(2'-hydroxyphenyl)-benzotriazoles, for example, the 5'-methyl-, 3'5'-di-tert-butyl-,5'-tert-butyl-,5'(1,1,3,3-tetramethylbutyl)-, 5-chloro-3',5'-di-tert-butyl-,5-chloro-3'-tert-butyl-5'-methyl-3'-sec-butyl-5'-tert-butyl-,4'-octoxy,3', 5'-ditert-amyl-3',5'-bis-(.alpha.,. alpha.-dimethylbenzyl)-derivatives. 2-Hydroxy-benzophenones, for example, the 4-hydroxy-4-methoxy-, 4-octoxy, 4-decyloxy-, 4dodecyloxy-,4-benzyloxy,4,2',4'-trihydroxy- and 2'-hydroxy-4,4'-dimethoxy derivative may also be used as UV absorbers and light stabilizers. UV absorbers and light stabilizers may also comprise esters of substituted and unsubstituted benzoic acids for example, phenyl salicilate, 4-tertbutylphenyl-salicilate, octylphenyl salicylate, dibenzoylresorcinol, bis-(tert-butylbenzoyl)-resorcinol, benzoylresorcinol, 2,4-di-tert-butyl-phenyl-3,5-di-tert-butyl-4-hydroxybenzoate and hexadecyl-3,5-di-tert-butyl-4-hydroxybenzoate.

Acrylates, for example, .alpha.-cyano-.beta.,.beta.-diphenylacrylic acid-ethyl ester or isooctyl ester, .alpha.-carbomethoxy-cinnamic acid methyl ester, .alpha.-cyano-.beta.-methyl-p-methoxy-cinnamic acid methyl ester or butyl ester, .alpha.-carbomethoxy-p-methoxy-cinnamic acid methyl ester, N-(.beta.-carbomethoxy-.beta.-cyano-vinyl)-2-methyl-indoline may be used as UV absorbers and light stabilizers.

Other examples for UV absorbers and light stabilizers may comprise nickel compounds, for example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine, nickel dibutyl-dithiocarbamate, nickel salts of 4-hydroxy-3,5-di-tert-butylbenzylphosphonic acid monoalkyl esters, such as of the methyl, ethyl, or butyl ester, nickel complexes of ketoximes such as of 2-hydroxy-4-methyl-penyl undecyl ketoxime, nickel complexes of 1-phenyl-4-lauroyl-5-hydroxy-pyrazole, optionally with additional ligands.

Sterically hindered amines may be used as UV absorbers and light stabilizers as for example bis (2,2,6,6-tetramethylpiperidyl)-sebacate, bis-5 (1,2,2,6,6-pentamethylpiperidyl)-sebacate, n-butyl-3,5-di-tert-butyl-4-hydroxybenzyl malonic acid bis(1,2,2,6,6,-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4butane-tetra-arbonic acid, 1,1'(1,2-ethanediyl)-bis-(3,3,5,5-tetramethylpiperazinone). These amines typically called HALS (Hindered Amines Light Stabilizers) include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate: 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-epsiloncaprolactam.

UV absorbers and light stabilizers may also comprise oxalic acid diamides, for examples, 4,4'-di-octyloxy-oxanilide, 2,2'-di-octyloxy-5',5'-ditert-butyloxanilide, 2,2'-di-dodecyloxy-5',5'di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4-di-tert-butyloxanilide and mixtures of ortho- and para-methoxy-as well as of o- and p-ethoxy-disubstituted oxanilides.

UV absorbers and light stabilizers may comprise hydroxyphenyl-s-triazines, as for example 2,6-bis-(2,4-dimethylphenyl)-4-(2-hydroxy-4octyloxyphenyl)-s-triazine, 2,6-bis(2,4-dimethylphenyl)-4-(2,4-dihydroxyphenyl)-s-triazine; 5 2,4-bis(2,4-dihydroxyphenyl)-6-(4-chlorophenyl)-s-triazine; 2,4-bis(2-hydroxy-4-(2-hydroxyethoxy)phenyl)-6-(4-chlorophenyl)-s-triazine; 2,4-bis(2hydroxy-4-(2-hydroxyethoxy)phenyl)-6-phenyl-s-triazine; 2,4-bis(2-hydroxy-4-(2-hydroxyethoxy)-phenyl)-6-(2,4-dimethylphenyl)-s-triazine; 2,4-bis(2-hydroxy-4-(2-hydroxyethoxy)phenyl)-6-(4-bromo-phenyl)-s-triazine; 2,4-bis(2-hydroxy-4-(2-acetoryethoxy)phenyl)-6-(4-chlorophenyl)-s-triazine, 2,4-bis(2,4-dihydroxyphenyl)-6-(2,4-dimethylphenyl)-1-s-triazine.

Metal deactivators as for example N,N'diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)-2-hydrazine, salicyloylamino-1,2,4-triazole, bis-benzyliden-oxalic acid dihydrazide, may also be used.

Phosphites and phosphonites as for example triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, 2,4,6-tri-tert-butylphenyl-2-butyl-2-ethyl-1,3-propanediol phosphite, bis(2,4-di-tert-butylphenyl)pentaerythritol diphosphite, bis(2,4-di-cumyl) pentaerithritol diphosphite, tristearyl sorbitol triphosphite, and tetrakis(2,4-di-tert-butylphenyl)4,4'-biphenylene diphosphonite may be used in some embodiments of the presentation.

Peroxide scavengers as for example esters of betathio-dipropionic acid, for example the lauryl, stearyl, myristyl or tridecyl esters, mercaptobenzimidazole or the zinc salt of 2-mercaptobenzimidazole, zinc-dibutyldithiocarbamate, dioctadecyidisulfide, pentaerythritottetrakis-(.beta.-dodecylmercapto)-propionate may be used.

Hydroxylamines, for example, N,N-dibenzylhydroxylamine, N,N-diethylhydroxylamine, N,N-dioctylhydroxylamine, N,N-dilaurylhydroxylamine, N,N-ditetradecyihydroxylamine, N,N- dihexadecylhydroxylamine, N,N-dioctadecylhydroxylamine, N-hexadecyl-N-octadecyl hydroxylamnine, N-heptadecyl-N-octadecylhydroxylamine, N,N-dialkylhydroxylamine derived from hydrogenated tallow amine may also be used in some embodiments of the present invention.

Nitrones, for example, N-benzyl-.alpha.-phenyl nitrone, N-ethyl-.alpha.-methyl nitrone, N-octyl-.alpha.-heptyl nitrone, N-lauryl-.alpha.-undecyl nitrone, N-tetradecyl-.alpha.-tridecyl nitrone, N-hexadecyl-.alpha.-pentadecyl nitrone, N-octadecyl-.alpha.-heptadecylnitrone, N-hexadecyl-.alpha.-heptadecylnitrone, N-octadecyl-.alpha.-pentadecyl nitrone, N-heptadecyl-.alpha.-heptadecyl nitrone, N-octadecyl-.alpha.-hexadecyl nitrone, nitrone derived from N,N-dialkylhydroxylamine derived from hydrogenated tallow amine may also be used.

Polyamide stabilizers, for example copper salts in combination with iodides and/or phosphorus compounds and salts of divalent manganese.

Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, Ca stearate, calcium stearoyl lactate, calcium lactate, Zn stearate, Mg stearate, for example Na ricinoleate and K palmitate, antimony pyrocatecholate or zinc pyrocatecholate, including neutralizers such as hydrotalcites and synthetic hydrotalcites, and Li, Na, Mg, Ca, Al hydroxy carbonates may be used in other embodiments of the present invention as also MgZn hydroxycarbonates, MgAl hydroxycarbonates and AlZn hydroxycarbonates, and metal oxides such as ZnO, MgO and CaO may be used.

Nucleating agents, for example, 4-tert-butylbenzoic acid, adipic acid, diphenylacetic acid, sodium salt of methylene bis-2,4-dibutylphenyl, cyclic phosphate esters, sorbitol tris-benzaldehyde acetal, and sodium salt of bis(2,4-di-t-butylphenyl) phosphate or Na salt of ethylidene bis(2,4-di-t-butyl phenyl)phosphate may also be used in some embodiments.

Fillers and reinforcing agents may comprise for example, calcium carbonate, silicates, glass fibers, asbestos, talc, kaolin, mica, barium sulfate, metal oxides and hydroxides, carbon black and graphite.

Other additives may be for example, plasticizers, epoxidized vegetable oils, such as epoxidized soybean oils, lubricants, emulsifiers, pigments, optical brighteners, flame-proofing agents, anti-static agents, blowing agents and thio-synergists such as dilaurythiodipropionate or distearylthiodipropionate.

In one embodiment, the stabiliser compound may be a benzimidazole based compound. In a second embodiment, the benzimidazole based stabilizer compound may be a thiazolobenzimidazolone compound and in a third embodiment, the benzimidazole based stabilizer compound may be a thioalkyl substituted benzimidazole compound. In other embodiments of the invention the benzimidazole based stabilizer compound may be selected from benzimidazole based compounds of the formula (I):

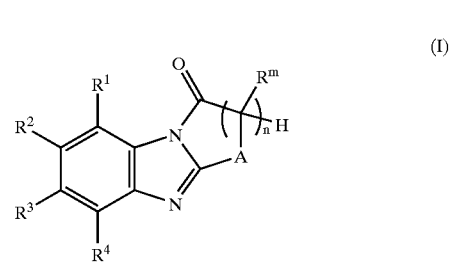

(I)

wherein $R^1$, $R^2$, $R^3$, $R^4$ in structure (I) are independently a carbocyclic structure, a fused structure, H, Cl, Br, F, $OCH_3$, $NO_2$, $CH_3$, $COOCH_2CH_3$, alkyl, aryl, alkaryl, and OH, SH, O-alkyl, O-Aryl, COOR, CONHR, halogen and $R^2$ and $R^3$ taken together form part of a saturated or an unsaturated, 5- or a 6-membered carbocyclic ring and A is independently S and O, and n is independently 1 and 2, $R^m$ in structure (I) is independently 2-naphthyl, H, $C_1$–$C_6$ alkyl, phenoxy, cycloalkyl, and a trisubstituted aromatic radical, of the formula $C_6H_3Y^1Y^2$ wherein $Y^1$ and $Y^2$ are independently H, Cl, Br, $CH_3$, $CF_3$, $OCH_3$ and $NO_2$, and benzimidazole based stabilizer compounds of the general formula given in structure (II):

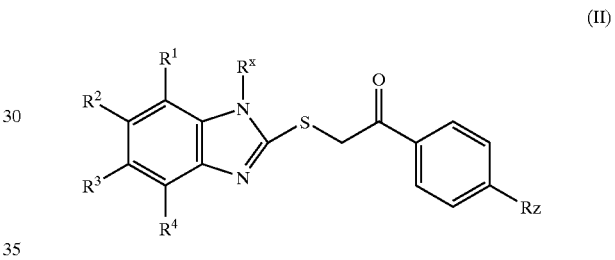

(II)

wherein $R^x$ in structure (II) is H, —CO—$(CH2)_{16}$—$(CH_3)$ and —CO—$CH_2$—$C_6H_5$, and $R^1$, $R^2$, $R^3$, and $R^4$ in structure (II) are independently H, Cl, Br F, $OCH_3$ $NO_2$, $CH_3$, $COOCH2CH_3$ and $R^z$ in structure (II) is independently H, Cl, $CH_3$ and $OCH_3$ wherein in structure (II) one or two atoms may be present on the sulfur atom forming the corresponding sulfone and sulfoxide structures.

In many embodiments the stabilizing benzimidazole based stabilizer compound may be selected from the group consisting of thiazolo[3,2-a]benzimidazole-3(2H)-one, 2-phenylthiazolo[3,2-a]benzimidazol-3(2H)-one, 6-chloro-2-phenylthiazolo[3,2-a]benzimidazol-3(2H)-one, ethyl-2-phenylthiazolo[3,2-a]benzimidazol-3(2H)-one-6-carboxylate, ethyl-2-phenylthiazolo[3,2-a]benzimidazol-3(2H)-one-7-carboxylate, 7-methoxy-2-phenylthiazolo[3,2-a]benzimidazol-3(2H)-one and combinations comprising the foregoing additive compounds.

The stabilizing additive compound and any reaction products thereof are preferably present in an amount effective to improve the stability of the composition. In one embodiment of the present invention the amount of the benzimidazole based stabilizing compound is generally less than about 5 weight percent based on the weight of the resin. In a second embodiment, the stabilizing benzimidazole based stabilizer compound may be present in an amount less than about 1000 ppm based on the weight of the resin, and in a third embodiment, in a range between about 5 ppm and about 950 ppm based on the weight of the resin.

The present invention includes a resin composition comprising a resin, and a benzimidazole based stabilizer compound present at a level between about 0.0001 and about 5 percent by weight, based on the total weight of the composition. In a second embodiment the benzimidazole based stabilizer compound may be a thiazolobenzimidazole compound and in a third embodiment the stabilizing benzimidazole based compound may have a thioalkyl substituent. In some embodiments the benzimidazole based stabilizer compound nay be selected from compounds of the structural formula (I):

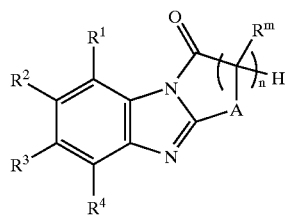

wherein $R^1$, $R^2$, $R^3$, $R^4$ in structure (I) are independently a carbocyclic structure, a fused structure, H, Cl, Br, F, $OCH_3$ $NO_2$, $CH_3$, $COOCH_2CH_3$ alkyl, aryl, alkaryl, and OH, SH, O-alkyl, O-Aryl, COOR, CONHR, halogen and $R^2$ and $R^3$ taken together form part of a saturated or an unsaturated, 5- or a 6-membered carbocyclic ring and A is independently S, and O, and n is independently 1 and 2, $R^m$ in structure (I) is independently 2-naphthyl, H, $C_1$–$C_6$ alkyl, phenoxy, cycloalkyl, and a trisubstituted aromatic radical, of the formula $C_6H_3Y^1Y^2$ wherein $Y^1$ and $Y^2$ are independently H, Cl, Br, $CH_3$, $CF_3$, $OCH_3$ and $NO_2$.

and benzimidazole based stabilizer compounds of the structural formula (II):

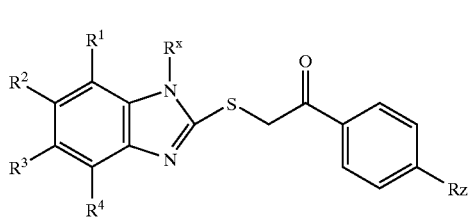

wherein $R^x$ in structure (II) is H, —CO—$(CH2)_{16}$—$(CH_3)$ and —CO—$CH_2$—$C_6H_5$, and $R^1$, $R^2$, $R^3$, and $R^4$ in structure (II) are independently H, Cl, Br F, $OCH_3$, $NO_2$, $CH_3$, $COOCH2CH_3$ and $R^z$ in structure (II) is independently H, Cl, $CH_3$ and $OCH_3$, and one or two atoms may be present on the sulfur atom forming the corresponding sulfone and sulfoxide structures.

The additives and stabilizers described herein are preferably present in an amount effective to improve composition stability. When one of the aforementioned additives and stabilizers is utilized, the amount is generally less than about 5 weight percent based on the weight of the resin and is preferably at least about 50 ppm based on the weight of the resin. The stabilizer combinations of this invention stabilize resins especially during high temperature processing with relatively little change in melt index and/or color, even though the polymer may undergo a number of extrusions. The instant stabilizers may readily be incorporated into the resins by conventional techniques, at any convenient stage prior to the manufacture of shaped articles therefrom. For example, the stabilizer may be mixed with the resin in dry powder form, or a suspension or emulsion of the stabilizer may be mixed with a solution, suspension, or emulsion of the polymer. The stabilized compositions of the invention may optionally also contain from about 0.001 to about 5%, preferably from about 0.0025 to about 2%, and especially from about 0.005% to about 1%, by weight of various conventional additives, such as those described previously, or mixtures thereof.

The compositions of the present invention can be prepared by a variety of methods, such as involving intimate admixing of the ingredients with any additional materials desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be precompounded with each other or with a portion of the polymeric resin to make a stabilizer concentrate. Moreover, it is also sometimes advantageous to employ at least one vent port to allow venting (either atmospheric or vacuum) of the melt. Those of ordinary skill in the art will be able to adjust blending times and temperatures, as well as component addition location and sequence, without undue additional experimentation.

While the stabilizers of this invention may be conveniently incorporated by conventional techniques into polymeric resins before the fabrication thereof into shaped articles, it is also possible to apply the instant stabilizers by a topical application to the finished articles. Articles may comprise benzimidazole based stabilizer compounds and resins and may be made into for example head lamp covers, roofing sheets, telephone covers, aircraft interiors, building interiors, computer and business machine housings, automotive parts, and home appliances. The articles may be made by extrusion, injection molding, compaction and other methods. This may be particularly useful with fiber applications where the instant stabilizers are applied topically to the fibers, for example, by way of a spin finish during the melt spinning process.

The benzimidazole based stabilizer compound may also be useful in thermoset resin compositions such as polyurethanes, epoxides, melamine, and phenolics; and may be useful in thermoset/plastic blends, and may be present at the levels set out above for thermoplastic resin compositions.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLE-1

Synthesis of Stabilizer A

Step (i): Synthesis of 1H-(benzoimidazol-2-ylsulfanyl) phenyl-acetic acid methyl ester: 2-Mercaptobenzimidazole (0.1M, 15 g) was added to a solution of Sodium hydroxide (0.1M 4 g) in methanol (50 ml) and stirred well to get a clear solution. To this mixture, 1-bromo phenylacetic acid methyl ester (1.1M, 2.5 g) was added dropwise and stirred for 2 hr. The solid obtained was filtered and washed with ice-cold methanol to get pure 1H-benzoimidazol-2-ylsulfanyl)phenyl acetic acid methyl ester as white solid (21.5 g). MP. 152° C. NMR(DMSO): δ 5.87(s, 1H, CH), 3.68(s, 3H, OCH3), 7.1–7.6(m, 10H, Aromatic & NH).

Step (ii): Synthesis of 2-Phenyl-thiazolo[3,2-a]benzimidazol-3-one (structure I): 1H-benzoimidazol-2-ylsulfanyl)phenyl acetic acid methyl ester (0.05 M, 15 g) and sodium carbonate (4 g), were added to toluene (150 ml) and refluxed for 40 hrs after which the carbonate was filtered. The toluene was removed under reduced pressure to get Thiazolo[3,2-a]benzimidazol-3-one as colorless solid (I) (6.7 g). MP 145° C. NMR(CDCl$_3$): δ 5.7(s, 1H, CH), 7.25–8.02(m, 10H, Aromatic & NH).

EXAMPLE-2

Synthesis of Stabilizer B

Synthesis of 2(1-H-Benzimidazol-2-yl-sulfanyl)-1-phenylethanone (Structure II): To a suspension of 2-Mercaptobenzimidazole (0.06M, 9 g) in methanol (50 ml) was added sodium hydroxide (0.06M, 2.4 g) and stirred for 30 min. to get a clear solution. To this solution, phenacyl bromide (0.05M, 10 g) was added slowly and stirred until the solid separates. The solid was filtered and washed thoroughly with 5% sodium hydroxide solution and methanol to get white solid (11.2 g). M.P. 167° C. NMR (DMSO): δ5.1(s, 2H, CH2), 7–8.2(m, 10H, Aromatic).

Stabiliser Screening Protocol

In a typical process for the practice of the present invention, the test stabilizer was blended/mixed with the resin using Turbula Blender for 30 minutes. The test stabilizer, if liquid, was preblended with a portion of a resin which was then subsequently blended with the resin and mixed well using Turbula Blender. The stabilized resin formulation was extruded at 100 rpm from 1 inch (2.54 cm) diameter extruder at 500 F (260 C) (Killion extruder). The rpm and temperatures may be adjusted according to the resin utilized. After each of the first, third and fifth extrusions, resin pellets were compression molded into 125 mil (3.2 mm) thick plaques at 370 F (188 C) and specimen yellowness index (YI) was determined. Low YI values indicate less yellowing. Additionally, the melt flow rate (in grams/10 minutes) was measured (ASTM-D-1238) on the pellets after the first, third and fifth extrusions. The closer the melt flow rate after the fifth extrusion is to the melt flow rate after the first extrusion indicates the superior process stabilization of the resin. In each of the examples in Tables 1, a commercially available polypropylene resin was used obtained from Basell as grade Profax R 6301. The compositions of Table 1 containing the title compounds of interest demonstrate the broad utility of the compositions.

As indicated in Table 1, only calcium stearate or TTBPP did not provide much melt processing stability to the polypropylene polymer. Formulation with Stabilizer B showed improved melt index properties compared to formulation with Stabilizer A and Stabilizer C. Melt process stabilization of polypropylene polymer using new class of benzimidazole title compounds namely Stabilizer A and Stabilizer B are proven in these above experiments. Stabilzer A and B containing the benzimidazole based stabilizer compounds have a melt flow rate after five multiple passes through an extruder that is very close to that of a known stabilizer composition (Stabilizer C) of significantly different chemical compostion. All of the materials A, B, and C show definite improvement of melt flow retention compared to the formulation containing only Ca St. Also, Table 1 demonstrate the broad utility and advantageous properties that may be obtained for compositions that contain title benzimidazole based derivatives described in the present invention.

The examples described above are for the purpose of illustration only and are not to be construed to limit the nature of scope of the instant invention in any manner whatsoever.

TABLE 1

|  | Stabilizer A | Stabilizer B | Stabilizer C | TTBPP | CaSt |
|---|---|---|---|---|---|
| Stabilizer A | 200 | | | | |
| Stabilizer B | | 200 | | | |
| Stabilizer C | | | 200 | | |
| TTBPP | | | | | 300 |
| CaSt | 500 | 500 | 500 | 500 | 500 |
| MFR | | | | | |
| Compounded | 13.79 | 12.99 | 13.26 | 19.6 | 17.5 |
| 1st Pass | 17.43 | 14.68 | 16.35 | >50 | 27.6 |
| 3rd Pass | 21.66 | 17.49 | 19.95 | — | >50 |
| 5th Pass | 28.82 | 22.44 | 24.32 | — | — |

Stabilizer A: 2-Phenylthiazolo[3,2-a]benzimidazol-3-one.
Stabilizer B: 2(1-H-Benzimidazol-2-yl-sulfanyl)-1-phenylethanone.
Stabilizer C: 5,7-Bis (1,1-dimethylethyl)-3-hydroxy-2(3H)-benzofuranone derivative.
TTBPP: Tris(2,4-di-tert-butylphenyl)phosphite.
CaSt: Calcium Stearate.

What is claimed is:

1. A stabilized composition comprising:
   a) a polymeric resin, and
   b) a non photo sensitive benzimidazole based stabilizer compound.

2. The composition of claim 1 wherein said benzimidazole based stabilizer compound is selected from thiazolobenzimidazolone based compounds and thioalkylsubstituted benzimidazole compounds.

3. The composition according to claim 1 wherein said benzimidazole based stabilizer compound is selected from compounds of structure (I):

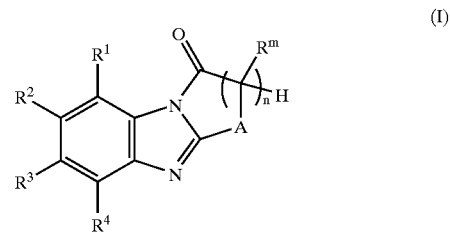

(I)

wherein in structure (I) $R^1$, $R^2$, $R^3$, $R^4$ are independently a carbocyclic structure, a fused structure, H, Cl, Br, F, $OCH_3$, $NO_2$, $CH_3$, $COOCH_2CH_3$, alkyl, aryl, alkaryl, and OH, SH, O-alkyl, O-aryl, COOR, CONHR, halogen and $R^2$ and $R^3$ taken together form part of a saturated or an unsaturated, 5- or a 6-membered carbocyclic ring and A is independently S and O, and n is independently 1 and 2, $R^m$ is independently 2-naphthyl, H, $C_1$–$C_6$ alkyl, phenoxy, cycloalkyl, and a trisubstituted aromatic radical, of the formula $C_6H_3Y^1Y^2$ wherein $Y^1$ and $Y^2$ are independently H, Cl, Br, $CH_3$, $CF_3$, $OCH_3$ and $NO_2$, and benzimidazole based compounds of structure (II) shown below:

(II)

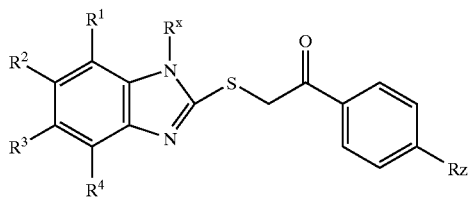

wherein in structure (II) $R^x$ is H, —CO—(CH2)$_{16}$— (CH$_3$) and —CO—CH$_2$—C$_6$H$_5$, and $R^1$, $R^2$, $R^3$, and $R^4$ are independently H, Cl, Br F, OCH$_3$ NO$_2$, CH$_3$, COOCH3CH$_2$ and $R^z$ is independently H, Cl, CH$_3$ and OCH$_3$, and one or two atoms is present on the sulfur atom forming the corresponding sulfone and sulfoxide structures.

4. The composition of claim 1 wherein said resin is at least one polymeric resin selected from the group consisting of polyolefin homopolymers and copolymers, polyesters, polyurethanes, polyalkylene terephthalates, polysulfones, polyimides, polyphenylene ethers, styrenic polymers, polycarbonates, acrylic polymers, polyamides, polyacetals, polyvinyl chloride and combinations comprising the foregoing resins.

5. The composition of claim 1 wherein said stabilizing benzimidazole based compound is present at a level between about 0.0001 and about 5 percent by weight based on the total weight of the composition.

6. The composition of claim 1 wherein said stabilizing benzimidazole based compound is present at a level between about 0.0005 and about 1.0 percent by weight based on the total weight of the composition.

7. The composition of claim 1, wherein said stabilising benzimidazole based compound is selected from the group consisting thiazolo[3,2-a]benzimidazole-3(2H)-one, 2-phenylthiazolo[3,2-a]benzimidazol-3(2H)-one, 6-chloro-2-phenylthiazolo[3,2-a]benzimidazol-3(2H)-one, ethyl-2-phenylthiazolo[3,2-a]benzimidazol-3(2H)-one-6-carboxylate, ethyl-2-phenylthiazolo[3,2-a]benzimidazol-3(2H)-one-7-carboxylate, 7-methoxy-2-phenylthiazolo[3,2-a]benzimidazol-3(2H)-one and combinations comprising the foregoing additive compounds.

8. The composition of claim 1 wherein said composition further comprises a compound selected from the group consisting of an alkaline metal salt of a fatty acid, metal oxides, hydroxycarbonates and combinations thereof.

9. The composition of claim 8, wherein said alkaline metal salt of a fatty acid is calcium stearate.

10. The composition of claim 8, wherein said metal oxide comprises an oxide selected from the group consisting of CaO, MgO, ZnO.

11. The composition of claim 8, wherein said hydroxycarbonate is selected from the group consisting of MgAl hydroxycarbonate, ZnAl hydroxycarbonate and ZnMg hydroxycarbonate.

12. The composition of claim 1, wherein the resin is a polyolefin resin.

13. The composition of claim 12 wherein polyolefin resin is selected from the group consisting of polypropylene, low density polyethylene, medium density polyethylene, high density polyethylene, linear low density polyethylene, ethylene/vinyl acetate copolymer, ethylene/propylene copolymer, and copolymers of ethylene or of propylene with other alpha-olefins.

14. The composition of claim 1 further comprising a stabilizer or mixture of stabilizers selected from the group consisting of phenolic antioxidants, 3-arylbenzofuranones, hindered amine stabilizers, ultraviolet light absorbers, phosphites, phosphonites, alkaline metal salts of fatty acids, metal oxides, hydrotalcites, epoxydized soybean oils, hydroxylamines, tertiary amine oxides, and/or thiosynergists.

15. Articles comprising the composition of claim 1.

16. A method for producing a stabilized resin composition, said method comprising admixing a benzimidazole based stabilizing compound with a resin.

17. The method of claim 16 wherein said stabilizing benzimidazole based compound is selected from thiazolobenzimidazolone based compounds and thioalkylsubstituted benzimidazole compounds.

18. The method of claim 16 wherein said stabilizing benzimidazole based compound is selected from benzimidazole based stabilizing compounds of the structural formula (I):

(I)

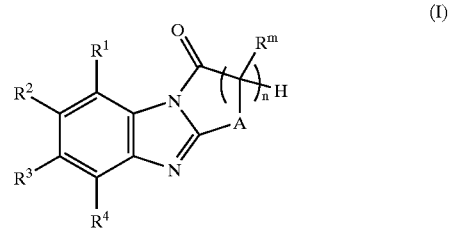

wherein $R^1$, $R^2$, $R^3$, $R^4$ in structure (I) are independently a carbocyclic structure, a fused structure, H, Cl, Br, F, OCH$_3$, NO$_2$, CH$_3$, COOCH$_2$CH$_3$ alkyl, aryl, alkaryl, and OH, SH, O-alkyl, O-Aryl, COOR, CONHR, halogen and $R^2$ and $R^3$ taken together form part of a saturated or an unsaturated, 5- or a 6-membered carbocyclic ring and A is independently S and O, and n is independently 1 and 2, $R^m$ in structure (I) is independently 2-naphthyl, H, $C_1$–$C_6$ alkyl, phenoxy, cycloalkyl, and a trisubstituted aromatic radical, of the formula $C_6H_3Y^1Y^2$ wherein $Y^1$ and $Y^2$ are independently H, Cl, Br, CH$_3$, CF$_3$, OCH$_3$ and NO$_2$.

and benzimidazole based stabilizing compounds of structure (II) below:

(II)

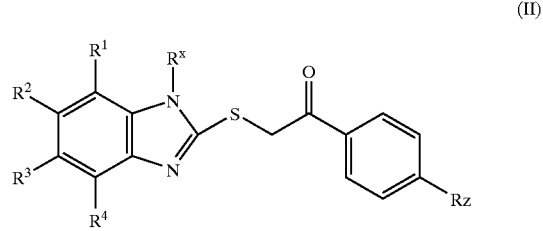

wherein $R^x$ in structure (II) is independently H, CO—(CH2)$_{16}$—(CH$_3$) and CO—CH$_2$—C$_6$H$_5$, wherein $R^1$, $R^2$, $R^3$, $R^4$ in structure (II) are independently H, Cl, Br, F, OCH$_3$, NO$_2$, CH$_3$, COOCH$_3$CH$_2$, and $R^z$ in structure (II) is independently from H, Cl, CH$_3$ and OCH$_3$ and one or two atoms is present on the sulfur atom forming the corresponding sulfone and sulfoxide structures.

19. The method of claim 16 wherein said resin comprises a thermoplastic resin selected from the group consisting of polyolefin homopolymers and copolymers, polyesters, polyurethanes, polyalkylene terephthalates, polysulfones, polyimides, polyphenylene ethers, styrenic polymers, polycarbonates, acrylic polymers, polyamides, polyacetals, polyvinyl chloride and combinations comprising the foregoing resins.

20. The method of claim 16, wherein said stabilizing benzimidazole based compound is selected from the group consisting of thiazolo[3,2-a]benzimidazole-3(2H)-one, 2-phenylthiazolo[3,2-a]benzimidazole-3(2H)-one, 2-phenylthiazolo[3,2-a]benzimidazol-3(2H)-one, 6-chloro-2-phenylthiazolo[3,2-a]benzimidazol-3(2H)-one, ethyl-2-phenylthiazolo[3,2-a]benzimidazol-3(2H)-one-6-carboxylate, ethyl-2-phenylthiazolo[3,2-a]benzimidazol-3(2H)-one-7-carboxylate, 7-methoxy-2-phenylthiazolo[3,2-a]benzimidazol-3(2H)-one and combinations comprising the foregoing additive compounds.

21. The method of claim 16 further comprising a stabilizer or mixture of stabilizers selected from the group consisting of phenolic antioxidants, 3-arylbenzofuranones, hindered amine stabilizers, ultraviolet light absorbers, phosphites, phosphonites, alkaline metal salts of fatty acids, metal oxides, hydrotalcites, epoxydized soybean oils, hydroxylamines, tertiary amine oxides, and/or thiosynergists.

\* \* \* \* \*